United States Patent [19]
Rains et al.

[11] Patent Number: 4,756,256
[45] Date of Patent: Jul. 12, 1988

[54] AERODYNAMIC DRAG REDUCTION FOR RAILCARS

[75] Inventors: Marvin G. Rains, Tualatin, Oreg.; David J. DeBoer, Walnut Creek, Calif.; Gary S. Kaleta, Warren; Roger P. Hawkins, Portland, both of Oreg.

[73] Assignee: Gunderson, Inc., Portland, Oreg.

[21] Appl. No.: 892,335

[22] Filed: Jul. 30, 1986

[51] Int. Cl.⁴ .............................................. B61D 17/00
[52] U.S. Cl. .................................... 105/1.1; 105/1.2; 105/15; 105/355; 296/1 S
[58] Field of Search ............... 105/1.1, 1.2, 15, 16, 105/380; 410/68; 296/1 S

[56] References Cited

U.S. PATENT DOCUMENTS

| | | | |
|---|---|---|---|
| 2,167,427 | 7/1939 | Tatum | 105/380 X |
| 2,243,906 | 6/1941 | Huet | 105/1.1 |
| 2,253,209 | 8/1941 | Patton | 105/1.1 |
| 2,287,025 | 6/1942 | Christianson | 105/15 |
| 3,697,120 | 10/1972 | Saunders | 105/1.1 X |
| 3,797,879 | 3/1974 | Edwards | 105/1.1 X |
| 3,866,967 | 2/1975 | Landry et al. | 105/1.2 X |
| 4,257,640 | 3/1981 | Wiley | 296/1 S |
| 4,508,380 | 4/1985 | Sankrithi | 105/1.1 X |
| 4,518,188 | 5/1985 | Witten | 105/1.1 X |
| 4,599,949 | 7/1986 | Hill | 105/355 |
| 4,624,188 | 11/1986 | Kaleta | 105/355 |

Primary Examiner—Kenneth J. Dorner
Assistant Examiner—Laurie K. Cranmer
Attorney, Agent, or Firm—Chernoff, Vilhauer, McClung & Stenzel

[57] ABSTRACT

An improved multi-unit railway car adapted to carry several intermodal cargo containers stacked in two tiers, with each of the several car units having substantially smooth side surfaces and including aerodynamic drag-reducing devices located at respective positions between adjacent car units and at each end of the multi-unit car. Between units are pairs of slender posts and, optionally, a slender crossbar, located so as to interrupt the gap between containers carried on adjacent units. At each end of the car, where there is a lengthier space, because of a four-wheeled truck and a coupler, is a pair of vertical panels with a small frontal area and an optional horizontal top member. For use on a car unit intended to carry short containers, the aerodynamic devices may be without the crossbar and horizontal top panel to provide clearance for a loader to handle lower tier containers.

37 Claims, 4 Drawing Sheets

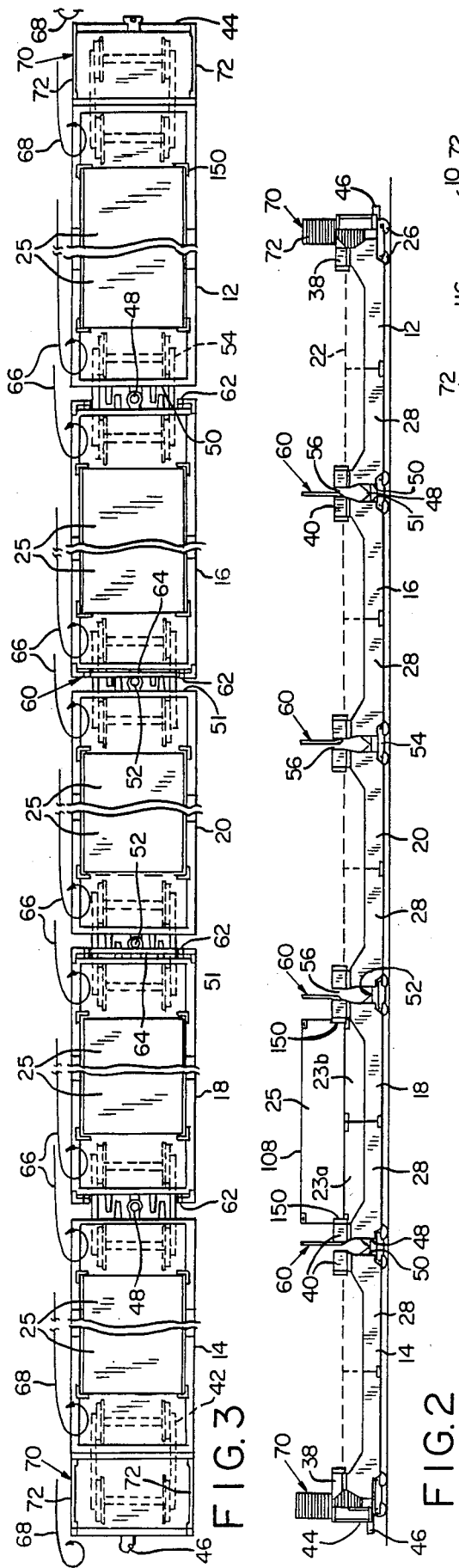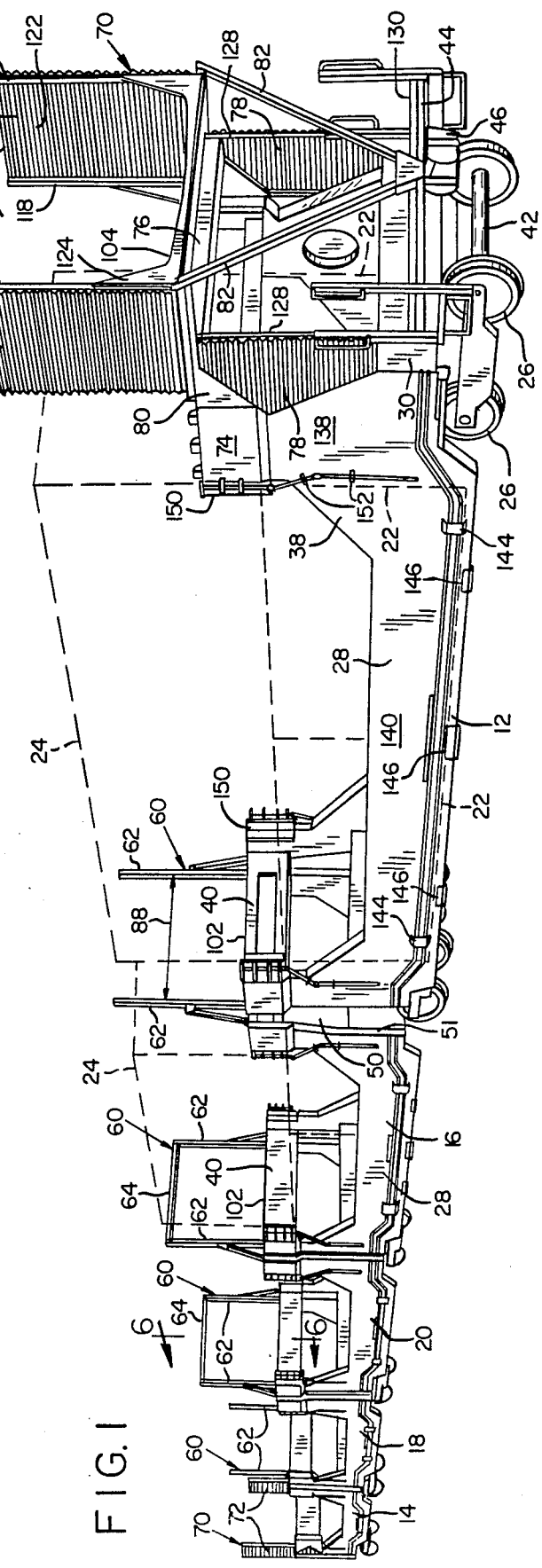

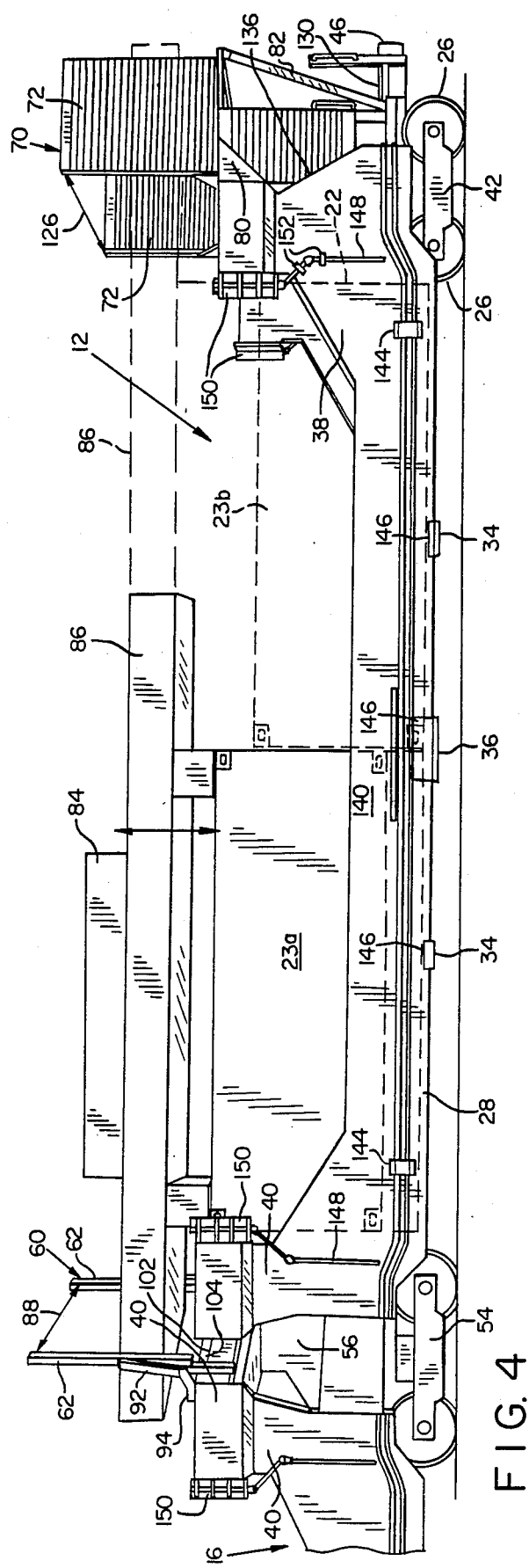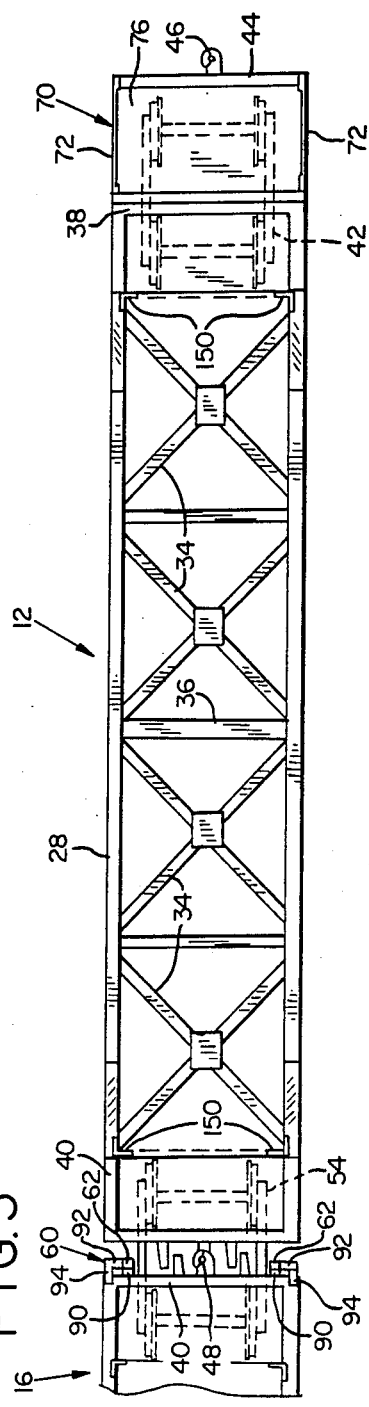

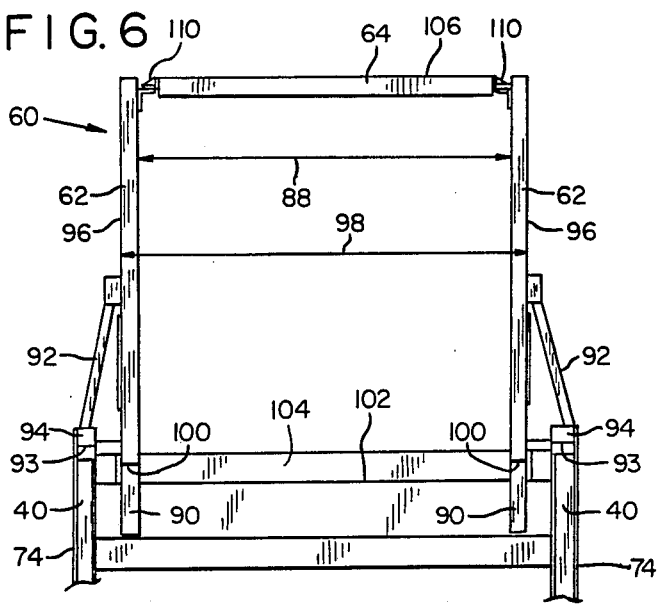
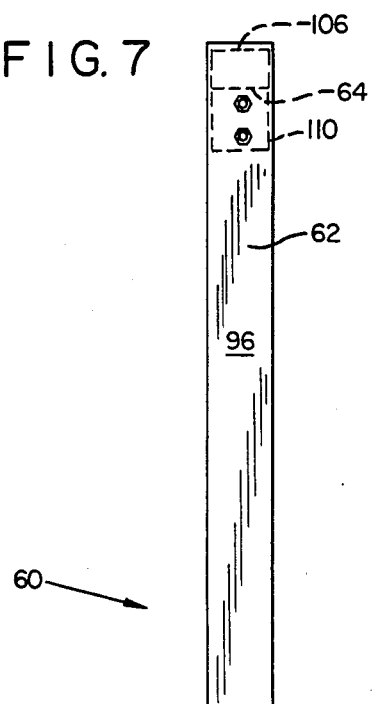
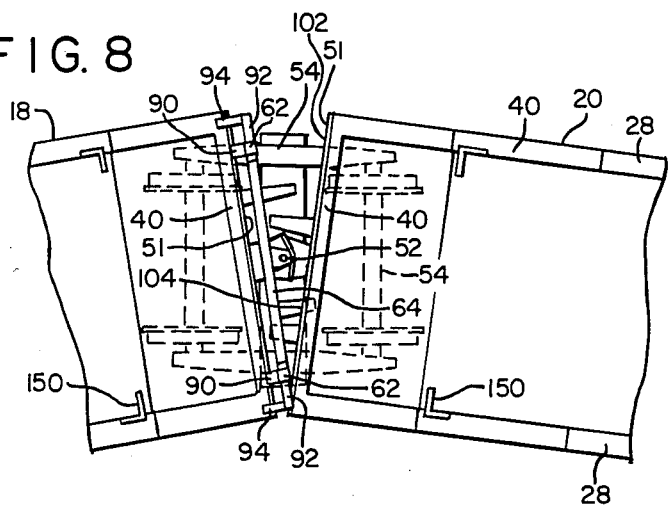
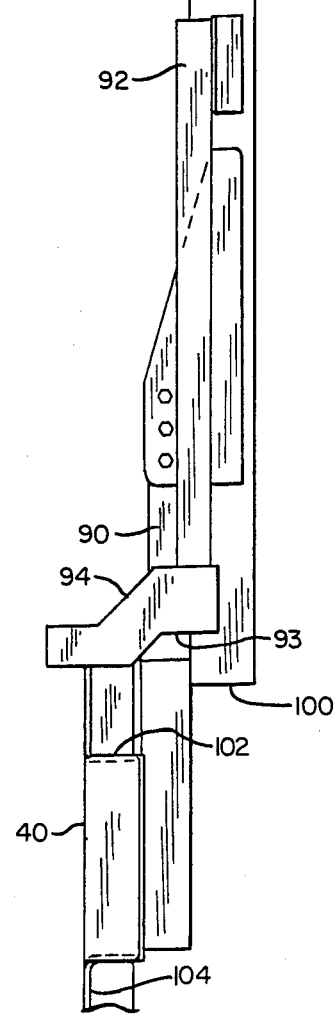

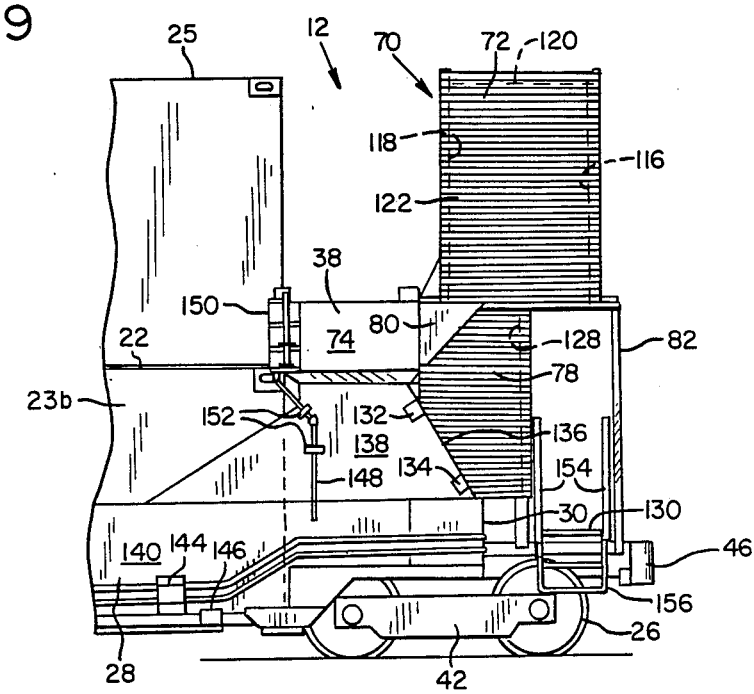
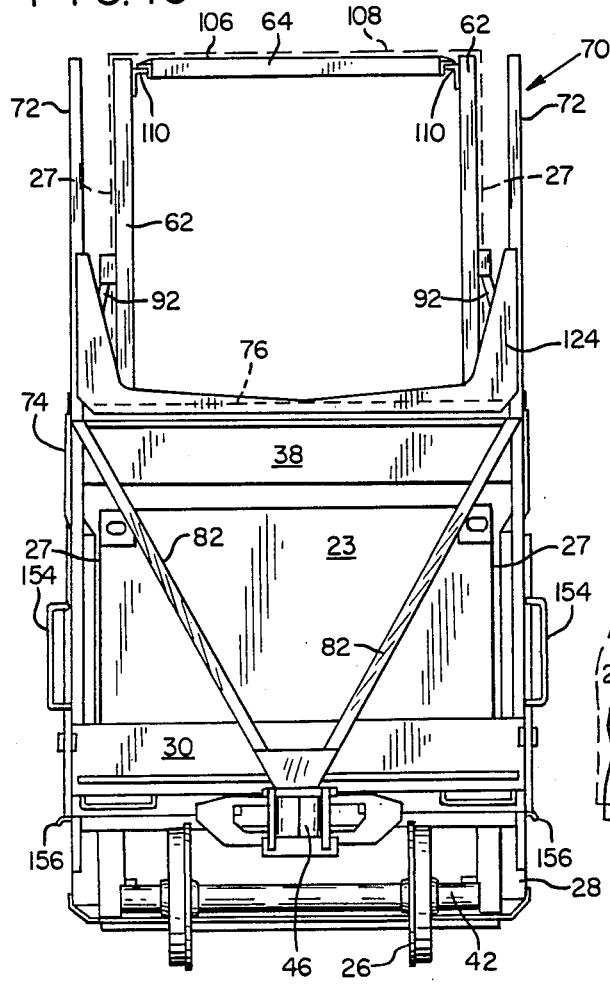
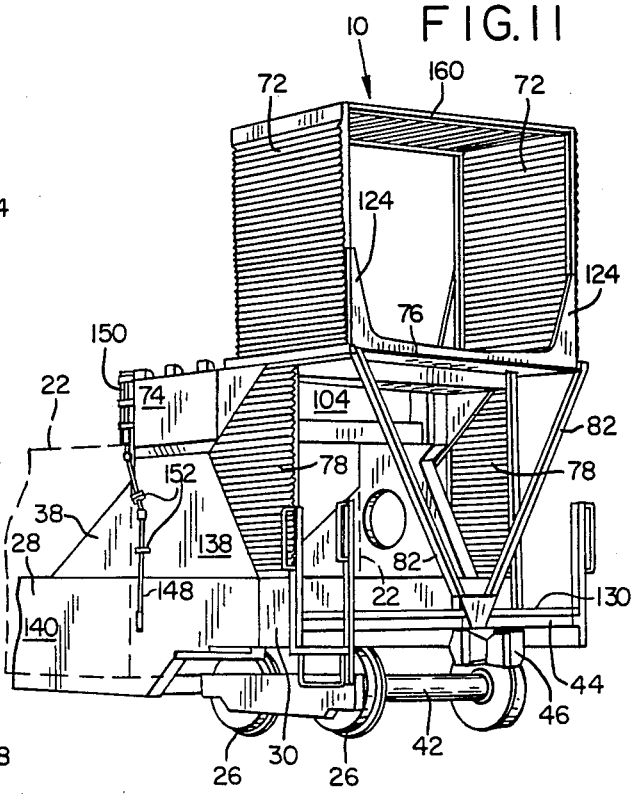

AERODYNAMIC DRAG REDUCTION FOR RAILCARS

BACKGROUND OF THE INVENTION

The present invention relates to limitation of the amounts of aerodynamic drag experienced by railway cars, and particularly to limitation of aerodynamic drag on multi-unit railcars configured for carrying intermodal cargo containers stacked in two tiers.

Railcars have been developed in recent years which can carry standard intermodal cargo containers stacked in two tiers, one above the other, without exceeding the maximum height limitations of railroad rights-of-way. Use of such cars makes long-haul transportation of such cargo containers by rail more economical than by tractor-trailer truck combination over the highways, because of the greater fuel economy resulting from using railway locomotives instead of a greater number of truck tractor units. Nevertheless, it is desired to reduce further the fuel requirements for hauling such cargo containers by rail.

Container cars have been designed recently which include several container-carrying units interconnected with one another by articulating joints each having a single two-axle truck with an end of each of two adjacent car units being pivotally supported by that truck. Such construction saves material and, consequently, reduces costs for construction of the multi-unit car. It also reduces the amount of fuel required to haul a given number of cargo containers, assuming that the multi-unit car can be fully loaded.

Particularly at higher railway train speeds, aerodynamic drag is a significant factor in the amount of fuel consumed in hauling a train. In the case of railway cars having a large frontal surface which is predominantly flat and perpendicular to the length of the car, as is the case when a cargo container is located in an upper tier of such a multi-unit container car, a significant amount of aerodynamic drag results from turbulence in the gaps between the ends of containers carried on adjacent multi-unit cars and on the adjacent units of a multi-unit car.

While it is to be expected that completely closing the gaps between cars would improve the aerodynamic characteristics of a train, the cost of closing such gaps would be prohibitive. Additionally, while the presence of streamlining structures between units of a multi-unit container car and between adjacent multi-unit cars would improve the aerodynamic characteristics of a train if the cargo container-carrying cars are fully loaded, the presence of such structures would cause an undesirably high amount of aerodynamic drag when container cars are hauled without being fully loaded, unless such devices are collapsible. Collapsible construction would, of course, add to the cost of such streamlining devices.

Apparently, a major cause of aerodynamic drag associated with container cars is the formation of large vortices between adjacent cars or car units. Larger gaps admit formation of larger vortices, containing larger volumes of air being moved turbulently, and thus absorbing larger amounts of energy which must be replaced by the locomotive in order to keep the train moving at a particular rate.

A separate factor which must be considered particularly with respect to design of cargo container-carrying railcars is that some of the equipment used to place cargo containers on such cars or remove containers from such cars requires certain amounts of clearance at the ends of cars when handling containers shorter than the usual forty-foot-long containers. Container-loading equipment used in many rail yards extends longitudinally several feet beyond each end of a twenty foot container being lifted, and so clearance for the loader must be provided at each end of a car into which such twenty foot containers are being loaded. Such a loader clearance, however, is not consistent with the presence of a fixed streamlined body filling all of the available space between cargo containers in adjacent cars (or adjacent units of the same car).

Additionally, various clearances must be provided for the trucks, handbrake equipment, draft gear, and hoses, extending between adjacent cars. As a result, useful streamlining structures extending longitudinally to fill all of the spaces between adjacent cars of a freight train are too expensive, too complex, and too likely to be damaged.

Wiley U.S. Pat. No. 4,257,640 discloses a single, vertical, longitudinally-extending, located panel extending between the cab of a truck and the forward end of a cargo-containing portion of such a truck. Wiley also discloses a laterally offset location for such a single panel. In the case of railway cars, however, a centrally located panel of the type disclosed by Wiley would need to be interrupted by a large amount of open space, because of the required clearances for trucks, couplings, and related portions of a railcar. It would still leave space available for the formation of significantly large vortices and zones of turbulent air movement between adjacent cars.

What is needed, therefore, are relatively simple structures for improving the aerodynamic characteristics of railway container cars. Such devices should be sturdy, but inexpensive to construct, light in weight, and effective for improving the aerodynamic characteristics of fully loaded container cars, yet low in drag when such cars are hauled in an empty condition. They should not interfere with loading of cars configured for carrying short containers, and should not interfere with the ability of such cars to negotiate curves in the railway tracks. Furthermore, such devices are needed both for the relatively small gaps between units of a multi-unit car and for the relatively large gaps between the ends of adjacent cars coupled together.

SUMMARY OF THE INVENTION

The present invention overcomes the shortcomings and disadvantages of the previously available aerodynamic drag reducing devices for railcars by providing an improved multi-unit container-carrying railcar which includes a first type of aerodynamic drag reducing device for interfering with formation of large vortices in a relatively short gap, such as that found between adjacent units of a multi-unit car, and a second type of aerodynamic drag reducing device for preventing formation of large vortices between such a car and another railcar.

The inter-unit gap interrupting aerodynamic devices according to the invention include a slender frame located between containers carried in the upper tiers of adjacent units of a multi-unit container car. The frame has vertical members and a horizontal member which are all located in general alignment with the sides and top surfaces of containers ordinarily carried in the car units. The device is supported by a car unit, but spaced apart longitudinally from the end of a cargo container on the car unit so as to be in an intermediate position, spaced apart from both of the confronting ends of two containers carried on adjacent car units of a multi-unit car. The slender frame configuration, because of its location substantially aligned with the outer surfaces of the cargo containers, promotes streamlined air flow along the car, and prevents formation of large vortices between adjacent units of the car without completely filling the gap between adjacent units of the car. Because of the slender shape of the vertical members and the horizontal member, however, the device itself creates only a small amount of drag when a container car equipped with the device is hauled at normal train speeds without cargo containers in the positions adjacently forward of and behind the device. The inter-unit gap interrupting device of the invention is mounted so as not to interfere with the ability of the car to negotiate curves in the tracks, and in a preferred embodiment of the invention, the crossbar may be constructed so as to be removable or absent to permit use of container loading equipment which overhangs the ends of short containers as they are loaded on or unloaded from a container-carrying railcar.

Located at the outer end of each end unit of a multi-unit container-carrying railcar according to the present invention is an aerodynamic device of the second, or inter-car, type contemplated by the present invention, in which solid panels, aligned with the exterior side surfaces of the end car, extend longitudinally and vertically approximately to the height of the tops of the uppermost containers carried on such an end unit. In a preferred embodiment of such a device, a certain amount of clearance is provided at the lower level of the end of the car as a passageway extending laterally across the end unit, to give access to the manual brake operating mechanisms, to cross from one side of the car to the other, and the like. Above the height of that passageway, however, the vertical panels of the inter-car gap narrowing aerodynamic device extend longitudinally outward as far as is practical without interfering with the ability of the car to negotiate curves while coupled to another car, and longitudinally inward toward cargo container positions on the end unit as far as is practical without interfering with loading and unloading the car.

In a preferred embodiment of the invention, the car units include upstanding bulkhead structures which support containers against longitudinal and lateral movement relative to the car itself, and the spaced apart vertical panels of the inter-car gap narrowing aerodynamic devices for end units according to the invention abut against the bulkhead structure. For an end unit upon which short containers are to be loaded by equipment which overhangs the ends of such short containers during loading and unloading, appropriate clearance is provided between the vertical panels to permit the loading equipment for such short containers to be used. This clearance extends downward within a short distance above the location of the top of a container properly located in the lower tier. Where an end unit of such a multi-unit car is configured only for carrying full length containers, so that there will be no overhanging loading equipment, a horizonal top panel may be provided at the height of the top of an upper container properly loaded on the unit, to give additional control against formation of zones of turbulence fed by movement of the train. The height of such a top panel is chosen to be aligned with the top of an upper one of two containers of the height expected to be carried.

As in the first type of aerodynamic drag reducing device described previously, the function of the drag reducing device for an end unit of the container car of the invention is to prevent the formation of large vortices which absorb energy which must be provided by the locomotive.

In a preferred embodiment of the invention, a railway car according to the invention includes exterior side surfaces which are substantially flat and smooth along the full length of each car unit's side sills and container-restraining bulkheads. This flat structure also improves the aerodynamic characteristics of the multi-unit car by comparison with other car designs which often include outwardly protruding, vertically-oriented structural stiffeners located at several positions along the length of a car unit.

It is therefore a principal object of the present invention to provide an improved railcar for carrying cargo containers which has a lower aerodynamic drag than previously available cars configured to carry such cargo containers.

It is another important object of the present invention to provide devices which can be added to existing railcars configured to carry cargo containers in order to reduce the aerodynamic drag of such railcars.

It is yet a further object of the present invention to provide for the reduction of aerodynamic drag of railcars configured to carry cargo containers at a reasonably low cost for construction, installation, and maintenance.

It is a principal feature of the present invention that it provides an aerodynamic drag-reducing, gap splitting device with a centrally open frame configuration which provides a small frontal surface area, but which, because of its location between longitudinally adjacent apart-spaced solid portions of car units and cargo containers carried thereon, reduces the size of potential paths of movement of turbulent air masses between adjacent portions of different car units and thereby reduces the aerodynamic drag experienced by the car.

It is another important feature of the present invention that it includes an aerodynamic drag-reducing device including a pair of vertical post members located between longitudinally adjacent solid body portions of a container-carrying railway car, located in or near a longitudinal vertical plane defined by the usual location of the sides of a cargo container carried on such a car, and including clearance between the vertical members sufficient not to interfere with the usual equipment used to load such containers upon such a car.

Another feature of the invention is the provision at the ends of the car of another aerodynamic drag reducing device including parallel vertical panels extending longitudinally away from the central portions of a container-carrying railway car and any containers located thereon, toward the extreme ends of such a car to the extent permitted by the need to negotiate curved tracks, and extending approximately to the height of the uppermost portions of such a car and any containers carried thereon, yet also presenting a small frontal surface area in order to minimize drag of such a car being hauled without a cargo container in an uppermost container position on the car.

Another feature of a multi-unit railway car according to the present invention is the provision of a horizontal, laterally-extending top member located at substantially the same height as the top surface of a container carried in an upper container position on the car and closing the gap between the upper edges of the vertical panels or the upper ends of the vertical post members of the aerodynamic devices according to the invention.

It is a principal advantage of the multi-unit container car according to the present invention that it produces a smaller amount of aerodynamic drag than is produced by previously known container cars.

It is another important advantage of the present invention that it provides aerodynamic devices which are less expensive to manufacture, install, maintain, and use than more complex devices, and which are thus lower in total cost than such other devices, over the lifetime of a railcar equipped with them.

Yet a further advantage of the railcar of the present invention is that it presents a greatly reduced amount of aerodynamic drag when the car is fully loaded, yet has an acceptably low drag when the car is not fully loaded, despite aerodynamic devices extending substantially to the full height of a loaded car.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a perspective view of a multi-unit railroad car configured to carry cargo containers which is an embodiment of the present invention.

FIG. 2 is a side elevational view, on a reduced scale, of the multi-unit container car shown in FIG. 1.

FIG. 3 is a a top plan view of the multi-unit container car shown in FIG. 2.

FIG. 4 is a perspective side view of an end unit and a portion of an intermediate unit of the multi-unit container car shown in FIG. 1.

FIG. 5 is a a top plan view of the end unit and portion of an intermediate unit shown in FIG. 4.

FIG. 6 is an elevational view, taken along line 6—6, of an aerodynamic drag reducing device on an intermediate unit of the multi-unit car shown in FIG. 1.

FIG. 7 is a side elevational view of a detail of the aerodynamic drag reducing device shown in FIG. 6.

FIG. 8 is a top plan view showing portions of a pair of adjacent ones of the intermediate units of the railway car shown in FIG. 1, with the multi-unit car located on a curved section of track.

FIG. 9 is a side elevational view of an outer end of an end unit of the multi-unit car shown in FIG. 1, showing the aerodynamic drag reducing device mounted thereon.

FIG. 10 is an end elevational view of the end car unit and aerodynamic drag reducing device shown in FIG. 9.

FIG. 11 is a perspective view of an outer end of an end unit of a multi-unit railway car according to the present invention, equipped with an inter-car aerodynamic drag reducing device including a top member.

DETAILED DESCRIPTION OF THE INVENTION

Referring now to the drawings, a multi-unit railway car 10 shown in FIGS. 1–3 includes a pair of end units 12 and 14, and three intermediate units 16, 18, and 20.

Each of the units 12, 14, 16, 18, and 20 of the car 10 defines a respective lower container position 22 and an upper container position 24 in which respective cargo containers 23 and 25 can be placed. Such cargo containers may be of various lengths, for example, 20 feet, 40 feet, 45 feet, or 48 feet, and the units 12, 14, 16, 18, and 20 of the car 10 are built to carry cargo containers of specific sizes or combinations of sizes. Such containers are of a standard width, permitting their use to carry goods in what is known as intermodal transport systems, wherein a particular container may be carried on a truck chassis over the highways, may be carried aboard a railway car such as the car 10, or may be carried aboard specially equipped ships for ocean transportation of the goods contained therein. Cargo containers may be of various heights, with 8 feet 6 inches being the most common height, although containers of 9 feet, or even 9 feet 6 inches, are becoming more common. The upper and lower container positions 23, 25, accordingly, establish container sidewall positions 27 (FIG. 10) and container top positions to be occupied by containers carried on the car 10, but such top positions will vary depending on the particular containers carried.

Because of the height limitations of railway rights-of-way, such containers can be carried stacked on one another only on a railway car, such as the car 10, which has room for a container 23 in a lower container position 22 supported with its lowermost portions below the tops of the wheels 26. This leaves room for a container 25 to be carried in the upper container position 24 atop the lower container position 22 without exceeding the maximum permissible height of the railway car 10 and its load.

Each car unit such as the end unit 12 or intermediate unit 16 includes a pair of side sills 28 interconnected at the ends of the car unit by respective transversely extending end bolsters 30 and 32. Transverse support member 36 and corner supports (not shown) provide support for cargo containers in the lower container position 22, while other horizontal members 34 interconnect the side sills 28 to stiffen the structure of the car units. Upstanding bulkhead structures 38 and 40 are provided at respective ends of each unit 12, 14, 16, 18, and 20 and provide longitudinal and lateral support for a container 25 in the upper container position 24, while the weight of the container 25 is supported by the container 23 or containers 23a, 23b, located in the lower container position 22 of the respective unit.

A four-wheeled truck 42 supports an outer end 44 of each of the end units 12, 14, and a coupler 46 is also provided on each end unit 12 and 14 to couple the railway car 10 to an adjacent car or locomotive. An articulating joint 48 connects an inner end 50 of each end unit 12 or 14 to an end of the adjacent intermediate unit, and similar articulating joints 52 interconnect adjacent ends of the adjacent ones of the intermediate units 16, 18, and 20. Each of the articulating joints 52 and 48 includes a single four-wheeled truck 54 and necessary bearings to interconnect the several car units and provide for a limited amount of relative motion of adjacent car units, in order that the multi-unit car 10 is able to negotiate curves and hills in the railway on which it is operated.

Unless a container 25 carried in an upper container position 24 is longer than the lower container position 22 of the car unit on which such a container 25 is carried, a considerable gap is left between cargo containers 25 carried in the upper container positions 24 of adjacent car units. Such a gap occurring between units of a single railway car 10 will be referred to hereinafter as an inter-unit gap 56, and such an interunit gap 56 is associated with each of the articulating joints 48 and 52. The effective size of each inter-unit gap 56 depends on the lengths of the containers 25 in the respective upper container positions 24, as will be understood. Thus, when a pair of 20-foot-long containers 23a, 23b or a single 40-foot-long container 23 is in the lower container position 22 of a car unit such as the end unit 12, and another 40-foot-long container 25 is located in the upper container position 24 of the end unit 12, with a pair of 40-foot-long containers 23 and 25 in the lower and upper container positions 22 and 24, respectively, of the intermediate unit 16, there is a significant longitudinally-extending inter-unit gap 56 between containers 25 in the upper container positions 24 of the units 12 and 16.

According to the present invention, an interunit gap interrupting device 60, shown also in FIGS. 4-6, is provided on one of the car units at each of the inter-unit gaps 56, in order to reduce the amount of turbulence which can develop as a result of movement of the railway car 10. The amount of turbulence is reduced by providing a solid body in the space between the adjacent ends of the car units. While a large transverse vertical panel in such a location provides some benefit, the device 60 appears to provide certain advantages, including somewhat greater reduction of drag even when the car 10 is fully loaded.

In its most basic form, the inter-unit gap interrupting device 60 comprises a pair of parallel vertical post members 62 spaced apart from each other, laterally of the car 10, and located in the inter-unit gap 56. Preferably, a cross-bar 64 extends horizontally between the upper ends of the vertical post members 62. By its location between the ends of containers located in the upper container positions 24 of adjacent car units, the inter-unit gap interrupting device 60 divides the gap 56 between such adjacent upper container positions into two smaller gaps. Each of these smaller gaps provides a significantly smaller opportunity for the formation of large zones of turbulent air flow, with the result that the inter-unit gap 56 absorbs a significantly smaller amount of energy when an inter-unit gap interrupting device 60 is present.

Another aerodynamic device, hereinafter referred to as an inter-car gap narrowing device 70, is provided at the outer end 44 of each of the end units 12 and 14. The device 70 includes a pair of vertical panel members 72 which are oriented longitudinally of the end unit 12 or 14 on which they are mounted and which extend upwardly above the respective bulkhead 38, substantially aligned laterally with the outer surfaces 74 of the bulkhead 38. A horizontal member 76 extends laterally between the panel members 72 and longitudinally outwardly, away from the bulkhead 38. A lower vertical panel 78 extends downward beneath each panel member 72 to the side sills 28 and end bolster 30. A pair of triangular vertical gussets 80, one extending outwardly from the sloping edge 136 of bulkhead 38 on each side of the car, support respective inner corners of the horizontal member 76, and a pair of diagonal support members 82, of square metal tubing for example, support the horizontal member 70 at respective outer corners which are spaced longitudinally further away from the bulkhead 38. The lower ends of the diagonal supports 82 are connected to the car at a medial location beneath the horizontal member 76.

As indicated by the arrows 66 in FIG. 3, representing air flow patterns past the car 10, the presence of the inter-unit gap interrupting devices 60 divides the inter-unit gaps 56 into two smaller portions leaving no room for development of a large vortex between containers 25 carried on adjacent units. Similarly, the inter-car gap narrowing devices 70 greatly reduce the space available for formation of vortices between containers carried on end units 12 or 14 and adjacent cars, as indicated by the arrows 68.

Referring now particularly to FIG. 4, an end unit 12 of a railway car 10 according to the present invention may be equipped to carry a pair of short containers such as 20-foot-long containers 23a and 23b, held end-to-end in the lower container position 22. Short containers are carried in the lower container positions of the car 10, in order that there will be lateral restraint for each end of the short containers, provided by the side sills 28. Conventional container-handling equipment such as the loader 84 often includes spreader beams 86 which are fixed in length, with the portions of such a loader which actually engage a container extending downwardly beneath the spreader beams 86 and located symmetrically spaced apart from the center line of the loader 84. A portion of the spreader beams 86 thus extends longitudinally beyond each end of a short container 23a being handled by such a loader 84.

In order to place the short container 23a into the lower container position 22 clearance is required at each end of the car unit for the spreader beams 86 to move downward as the container is lowered fully into the lower container position 22. For this reason, lateral spacing 88 is provided between the vertical post members 62, and the crossbar 64 is omitted from the inter-unit gap interrupting device 60 located in an inter-unit gap 56 between car units where either of them is to carry short containers. In order to provide ample clearance the lateral spacing 88 should be at least 6 feet and is preferably 7 feet, 10 inches.

In order to place each inter-unit gap interrupting device 60 as close as possible to the center of the respective inter-unit gap 56, each inter-unit gap interrupting device 60 is carried on mounts 90 which extend upwardly and taper longitudinally outwardly from the bulkhead 40 of the respective intermediate unit. Diagonal braces 92 extend upwardly and diagonally laterally inwardly and are supported on diagonal brackets 94 to support respective ones of the vertical post members 62. The diagonal braces 92 have their lower bottom ends 93 located aligned laterally no further out than the outer surfaces 74 of the bulkheads 38 and 40, while the outer surfaces 96 of the vertical post members 62 are separated laterally by a distance 98 which is preferably approximately equal to or slightly less than the width of a container 25 of the size which the car 10 is designed to carry. The outer surfaces 96 are thus laterally aligned at least approximately with the container sidewall position defined by the respective unit. Use of such a distance 98 and lateral placement of the post members 62 has been found to promote smooth flow of air along the sides of a car 10 loaded with containers.

The lateral spacing 88 between the vertical post members 62 is preferably as wide as is practical consistent with sufficient stiffness of the vertical post members 62, in order to provide the clearance for convenience in operating loaders such as the loader 84. Additionally, the frontal area of the inter-unit gap interupting device 60 should be no greater than necessary, in order that the gap interrupting device 60 will present as little drag as possible to oppose movement of the car 10 when there is no container 25 in an upper container position 24 of a car unit adjacent a particular articulating joint 48 or 52. The vertical post members 62 may, for example, be of 4"×4"×3/16" square steel tubing, while the diagonal braces 92 may be of suitable angle stock.

Each bulkhead 38 or 40 includes a transversely-extending vertical end sheet 104 to which a lower end mount 90 is fixedly attached, as by welding. The end sheet 104 includes an outwardly projecting channel portion at midheight which is the longitudinally outwardmost portion 102 of the bulkhead 40. The location and maximum dimension possible longitudinally of the car for the vertical post members 62 and diagonal braces 92 are limited, however, by the distance between the bulkheads 40 of the adjacent car units, and by the minimum radius of curvature of track over which the car 10 is intended to be moved, in order that the vertical post members 62 and diagonal braces 92 will not come into contact with the bulkhead 40 of an adjacent car unit, or with a container 25 in the upper container position 24 of the adjacent car unit. As will be seen by referring to FIGS. 7 and 8, the vertical post members 62 and crossbar 64 may extend longitudinally of the unit beyond the bulkhead 40, since the bottom ends 93 and 100 of the vertical post member 62 and diagonal brace 92 are located above the height of the longitudinally outwardly projecting transverse member 102 of the bulkhead 40.

The crossbar 64 is preferably attached at the upper ends of the vertical posts 62 by the use of brackets 110 bolted or similarly fastened to the vertical post members 62 and the respective ends of the crossbar 64. The height of the crossbar 64 is ideally such as to align its uppermost surface 106 with the tops 108 of adjacent containers 25 located in the upper container positions 24 of the car units, and not to protrude above them. Because of the possibility of carrying containers 23 and 25 of different heights at different times it is ordinarily expedient for the crossbar 64 to be located aligned vertically with the height of the top 108 of a container 25 of the most abundant height in the railroad under whose control the car is to be used. Optionally, the post members 62 may include provision for adjusting the height of the crossbar 64.

The inter-car gap narrowing devices 70 are shown in greater detail in FIGS. 9–11, where it will be seen that each vertical panel 72 includes a frame including vertical tubular frame members 116 and 118 extending upwardly from the horizontal member 76 at the outer and inner corners, respectively. A longitudinal horizontal frame member 120 extends between the tops of the vertical frame members 116 and 118 of each vertical panel 72. A skin 122 is of corrugated sheet metal, with the bends extending horizontally, longitudinally of the car 10, so that the skin 122 is self-stiffening, supported by the frame members 116, 118, and 120, with minimum weight and producing a minimum of drag resulting from the corrugation. U-shaped transverse vertical brace plates 124 provide lateral support for the tubular vertical frame members 116 and 118 above the horizontal member 76, but leave a wide enough loader clearance distance 126, for example, 6 feet or more, extending laterally between the vertical panels 72.

The lower vertical panels 78, extending between the horizontal member 76 and the car frame bolster member 30 are similarly of corrugated sheet material, supported along their vertical outer edges by tubular metal vertical frame members 128. The lower vertical panel members 78 do not extend as far toward the extremity of the outer end 44 as do the vertical panels 72, because a transverse walkway 130, covered by the horizontal member 76 is provided at the end of the car 10 to give access to the handbrake and other items as may be required while the car 10 is included in a train. The lower vertical panels 78 are attached, by conventional fasteners, to the diagonal lower edge of the gusset 80, and to two brackets 132 and 134, which may be welded to the downwardly and longitudinally outwardly sloping edges 136 of the bulkhead 38.

Further enhancing the aerodynamic smoothness of the multi-unit car 10 is the generally flat configuration of the laterally outwardly facing, longitudinally-extending surfaces 74, 138, and 140 of the side sills 28 and bulkheads 38 and 40, which are free of outwardly protruding structural members such as vertical stiffeners, which are used in many railcar side sills but are unnecessary in the car 10 because of the structure of its side sill members, as is described in greater detail in U.S. Pat. No. 4,599,949, the disclosure of which is hereby included herein by reference. The outer surfaces of the areas 74, 138, and 140 are thus substantially planar and are oriented generally vertically and longitudinally of the multi-unit car 10. They are free of protrusions except for pipe supports 144 and transverse support member attachment points 146, located within a few inches of the bottom edge of each of the side sills 28, the operating shafts 148 associated with container guides 150, and the supports 152 which hold the operating shafts 148, located on the bulkheads 38 and 40. Vertical handholds 154 and ladder rungs 156 associated with the walkway 130 at each outer end 44 of the multi-unit railcar 10, together with the operating shafts 148, supports 152 and pipe supports 144, occupy only a minor portion of the outer surface areas 74, 138, and 140 of the exterior longitudinal surfaces of the multi-car 10, leaving an aerodynamically smooth configuration of the car, overall.

Because of the inter-unit gap interrupting devices 60 and inter-car gap narrowing devices 70 the configuration of the multi-unit car 10, particularly when loaded fully with containers in both the lower container position 22 and upper container position 24 of each of the several units of the car, enables containerized cargo to be transported more economically by rail than has previously been possible.

Container loaders developed more recently than the loader 84 shown in FIG. 4 do not protrude beyond the ends of short containers, making it likely that it may become unnecessary in the future to provide the lateral spacing 88 between the upright post members 62 and the lateral loader clearance distance 126 between the vertical panels 72 which is provided in the railcar 10 of the present invention, and the crossbar 64 will thereafter not need to be omitted or removable, although it may still be advantageous for it to be adjustable in height. Furthermore, as shown in FIG. 11, it will then be practical to provide a transverse top member 160 extending generally horizontally between the upper longitudinal frame members of the vertical panels 72. The transverse top member 160 closes a portion of the top of the inter-car gap without greatly increasing the frontal surface area of the inter-car narrowing device 70, thus further reducing the available space for development of turbulence in the gap between containers 25 carried on a car 10 and an adjacent car or locomotive.

The gap narrowing devices 60 and 70 of the present invention, because they both present a relatively small frontal surface area, create no more than an acceptable amount of drag in addition to the drag of the empty multi-unit car without such gap narrowing devices, yet provide enough reduction of the aerodynamic drag experienced by a loaded multi-unit car 10 to be an economically justified additional cost in the construction of the multi-unit car 10. Additionally, because of the relatively simple structure of each of the inter-unit gap narrowing devices 60 and the inter-car gap narrowing device 70, damage to the devices which is likely to occur because of loader operator error is expected to be less expensive to repair than damage to more complex aerodynamic devices.

Furthermore, while the aerodynamic drag-reducing inter-unit gap interrupting devices 60 are best adapted to multi-unit cars such as the car 10, the inter-car gap narrowing device 70 is also applicable to a single-unit car (not shown) equipped to carry cargo containers, and particularly to such a single-unit car equipped to carry cargo containers in a stacked configuration.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A multi-unit railcar configured to carry removable intermodal cargo containers, comprising:
   (a) at least two units each having a pair of opposite ends, said ends defining respective heights and respective ends of adjacent ones of said units being adjacently located with respect to one another, and at least one of said units defining a respective container position therein;
   (b) an articulating joint interconnecting said adjacently located ends of said units with each other, said adjacently located ends defining an inter-unit gap;
   (c) an inter-unit gap interrupting device located in said inter-unit gap between said adjacently located ends, said inter-unit gap interrupting device being located spaced longitudinally apart from said container position and including a pair of vertical post members spaced laterally apart from each other and extending upward above the heights of said adjacently located ends.

2. The railcar of claim 1 wherein said inter-unit gap interrupting device is mounted on one of said car units.

3. The railcar of claim 1, including at least three car units, including one of said inter-unit gap interrupting devices associated with each of said inter-unit gaps defined by said car units.

4. The railcar of claim 1 wherein said container position defines a container sidewall position and each of said post members has an outer surface aligned laterally with said container sidewall position.

5. The railcar of claim 4 wherein said vertical post members of each said inter-unit gap interrupting device are separated by a predetermined lateral loader clearance therebetween.

6. The railcar of claim 5 wherein said lateral loader clearance is at least 6 feet.

7. The railcar of claim 1, each said unit including a pair of bulkhead structures, each of said pair being associated with a respective end of a respective unit, said bulkhead structures defining a cargo container upper position spaced longitudinally inward from each end of the respective unit for receiving a cargo container in the form of a generally rectangular closed solid, at least a part thereof extending upwardly above said bulkhead structure when said cargo container is located in said cargo container upper position.

8. A multi-unit railcar configured to carry removable intermodal cargo containers, comprising:
   (a) at least two units each having a pair of opposite ends, respective ends of adjacent ones of said units being adjacently located with respect to one another, and at least one of said units defining a respective container position therein;
   (b) an articulating joint interconnecting said adjacently located ends of said units with each other, said adjacently located ends defining an inter-unit gap;
   (c) an inter-unit gap interrupting device located in said inter-unit gap between said adjacently located ends, said inter-unit gap interrupting device being located spaced longitudinally apart from said container position and including a pair of vertical post members spaced laterally apart from each other, said container position including a container top position located at a predetermined height, wherein said gap interrupting device includes a horizontal crossbar extending laterally between said vertical post members at said height of said container top position.

9. A multi-unit railcar configured to carry removable intermodal cargo containers, comprising:
   (a) at least two units each having a pair of opposite ends, respective ends of adjacent ones of said units being adjacently located with respect to one another, and at least one of said units defining a respective container position therein;
   (b) an articulating joint interconnecting said adjacently located ends of said units with each other, said adjacently located ends defining an inter-unit gap;
   (c) an inter-unit gap interrupting device located in said inter-unit gap between said adjacently located ends, said inter-unit gap interrupting device being located spaced longitudinally apart from said container position and including a pair of vertical post members spaced laterally apart from each other, wherein said container position defines a container sidewall position and each of said post members has an outer surface aligned laterally with said container sidewall position, said container position further including a container top position located at a predetermined height, and said inter-unit gap interrupting device including a horizontal crossbar extending laterally between said vertical post members, wherein said crossbar has a top surface located at a predetermined height relative to said railcar, said predetermined height corresponding to said height of said container top position.

10. A multi-unit railcar configured to carry removable intermodal cargo containers, comprising:

(a) at least two units each having a pair of opposite ends, respective ends of adjacent ones of said units being adjacently located with respect to one another, and at least one of said units defining a respective container position therein;

(b) an articulating joint interconnecting said adjacently located ends of said units with each other, said adjacently located ends defining an inter-unit gap;

(c) an inter-unit gap interrupting device located in said inter-unit gap between said adjacently located ends, said inter-unit gap interrupting device being located spaced apart from said container position longitudinally of said railcar, said inter-unit gap interrupting device including a pair of vertical post members spaced laterally apart from each other, at least a first one of said units interconnected by said articulating joint including a transversely oriented bulkhead having a longitudinally outwardly protruding transverse portion, both of said post members being mounted on the other one of said units interconnected by said articulating joint and each of said post members including a bottom end located at a greater height than is said longitudinally outwardly protruding transverse portion of said bulkhead of said first one of said units.

11. The railcar of claim 10 including a pair of oppositely oriented end units, each said end unit having a pair of opposite sides and an outer end, and said railcar having an inter-car gap narrowing device located adjacent said outer end of one of said end units, said inter-car gap narrowing device including a pair of rigid, generally planar vertical panels spaced laterally apart from each other, each of said vertical panels being oriented generally parallel with said sides of said end unit and extending upwardly adjacent said upper tier.

12. A multi-unit railcar configured to carry removable intermodal cargo containers, comprising:

(a) at least two units each having a pair of opposite ends, respective ends of adjacent ones of said units being adjacently located with respect to one another, and at least one of said units defining a respective container position therein;

(b) an articulating joint interconnecting said adjacently located ends of said units with each other, said adjacently located ends defining an inter-unit gap;

(c) an inter-unit gap interrupting device located in said inter-unit gap between said adjacently located ends, said inter-unit gap interrupting device being located spaced longitudinally apart from said container position, said inter-unit gap interrupting device including a pair of vertical post members spaced laterally apart from each other, said at least two units including a pair of end units, each end unit having respective sides and defining a container position for receiving a cargo container thereon, said container position including a container top position, and said railcar having a pair of sides and an outer end supported on a truck, and including a coupler connected with said outer end, said railcar further including an inter-car gap narrowing device associated with said outer end and including a pair of parallel vertical panels spaced laterally apart from one another and aligned laterally with the respective sides of said end unit, each of said vertical panels extending upwardly substantially to said container top position.

13. The railcar of claim 12 wherein each of said vertical panels extends longitudinally of said end unit toward said coupler a distance at least equal to the length of said truck supporting said outer end.

14. The railcar of claim 12, wherein said container top position is located at a predetermined height, and including a horizontal panel extending between said vertical panels substantially at said height of said container top position.

15. The railcar of claim 12, said end unit defining a lower container position thereon, and said inter-car gap narrowing device defining a loader clearance space at least 6 feet wide between said vertical panels at all heights above a predetermined height related to said lower container position.

16. The multi-unit railcar of claim 12, including two end units and at least one other unit and having one of said inter-unit gap interrupting devices mounted on an end of one of said units at each inter-unit gap defined within said railcar.

17. A multi-unit railcar configured to carry removable intermodal cargo containers in respective upper and lower tiers thereupon, comprising:

(a) at least two car units, including a pair of oppositely oriented end units, each said end unit having a pair of opposite sides and an outer end, and each said end unit including a coupler connected with said outer end; and (b) an inter-car gap narrowing device located adjacent said outer end of one of said end units, said inter-car gap narrowing device including a pair of vertical panels spaced laterally apart from each other, each being oriented generally parallel with said sides of said end unit, and each of said vertical panels extending upwardly adjacent said upper tier, respective ones of said car units defining respective container positions and having respective ends located mutually adjacent one another, said multi-unit car including an articulating joint interconnecting the ends located mutually adjacent one another, said units defining an inter-unit gap adjacent each said articulating joint, and said railcar including an inter-unit gap interrupting device located in said inter-unit gap spaced longitudinally apart from each said container position, said inter-unit gap interrupting device including a pair of vertical post members spaced laterally apart from each other.

18. The railcar of claim 17 wherein said inter-unit gap interrupting device is mounted on one of said car units.

19. The railcar of claim 17, including at least three car units interconnected to one another end to end, and including one of said gap-interrupting devices located in each of said inter-unit gaps defined by said car units.

20. The railcar of claim 17 wherein each of said container positions includes a container sidewall position and each of said post members has an outer surface aligned laterally with said container sidewall position.

21. The railcar of claim 17 wherein said container position includes a container top position and said inter-unit gap interrupting device includes a horizontal crossbar extending laterally between said vertical post members, said crossbar having a top surface located at the height of said container top position.

22. The railcar of claim 17 wherein said vertical posts of each said inter-unit gap interrupting device are separated by a lateral clearance of at least 6 feet therebetween.

23. The railcar of claim 17 wherein each of said end units defines a respective upper container position including an upper container top position located at a predetermined height and wherein each of said vertical panels extends upwardly substantially to said height of said upper container top position.

24. The railcar of claim 17, including a horizontal crossbar extending laterally between said vertical post members and connected to each of them.

25. A railcar including structure defining respective upper and lower container positions for receiving generally rectangular intermodal cargo containers therein, said upper container position defining a container top position located at a predetermined height and said railcar including a body having an outer end including bulkhead means for longitudinally and laterally restraining a cargo container in said upper container position, and including a coupler connected with said outer end, and further including an inter-car gap narrowing device including a pair of parallel vertical panels spaced laterally apart from one another, each of said vertical panels extending upward substantially to said height of said container top position of said upper container position, wherein each of said vertical panels extends longitudinally away from a location adjacent said container position toward said coupler to a predetermined distance from the extremity of said coupler, said predetermined distance being established by the minimum clearance required to avoid interference with another car while said car negotiates a curve in a railway track.

26. A railcar including structure defining respective upper and lower container positions for receiving generally rectangular intermodal cargo containers therein, said upper container position defining a container top position located at a predetermined height and said railcar including a body having an outer end including bulkhead means for longitudinally and laterally restraining a cargo container in said upper container position, and including a coupler connected with said outer end, and further including an inter-car gap narrowing device including a pair of rigid, generally planar, parallel vertical panels spaced laterally apart substantially to said height of said container top position of said upper container position and extending longitudinally away from said upper container position toward said coupler.

27. The railcar of claim 26 including a horizontal panel extending between said vertical panels at a predetermined height above the top of said lower container position and below the height of said container top position of said upper container position.

28. The railcar of claim 26, said inter-car gap narrowing device defining a loader clearance space at least 6 feet wide between said vertical panels at all heights above a predetermined height relative to the height of the top of said lower container position.

29. A multi-unit railcar configured to carry removable intermodal cargo containers in respective upper and lower tiers thereupon, comprising:
(a) at least two car units, including a pair of oppositely oriented end units, each said end unit having a pair of opposite sides and an outer end;
(b) an inter-car gap narrowing device located adjacent said outer end of one of said end units, said inter-car gap narrowing device including a pair of rigid, generally planar, vertical panels spaced laterally apart from each other, each being oriented generally parallel with said sides of said end unit, and each of said vertical panels extending upwardly adjacent said upper tier and extending longitudinally in the direction of said outer end; and
(c) each of said car units including a pair of oppositely located side sills each side sill having a lateral outer side which is generally planar and free from vertically-oriented load-bearing structural portions thereof protruding laterally outwardly beyond said outer side.

30. A multi-unit railcar configured to carry removable intermodal cargo containers in respective upper and lower tiers thereupon, comprising:
(a) at least two car units, including a pair of oppositely oriented end units, each said end unit having a pair of opposite sides and an outer end;
(b) an inter-car gap narrowing device located adjacent said outer end of one of said end units, said inter-car gap narrowing device including a pair of rigid, generally planar vertical panels spaced laterally apart from each other, each being oriented generally parallel with said sides of said end unit, and each of said vertical panels extending upwardly adjacent said upper tier; and
(c) each of said vertical panels of said inter-car gap narrowing device comprising a respective sheet of corrugated metal supported by respective vertical strength members located adjacent the respective inner and outer margins thereof.

31. A multi-unit railcar configured to carry removable intermodal cargo containers in respective upper and lower tiers thereupon, comprising:
(a) at least two car units, including a pair of oppositely oriented end units, each said end unit having a pair of opposite sides and an outer end;
(b) an inter-car gap narrowing device located adjacent said outer end of one of said end units, said inter-car gap narrowing device including a pair of rigid, generally planar vertical panels spaced laterally apart from each other, each being oriented generally parallel with said sides of said end unit, and each of said vertical panels extending upwardly adjacent said upper tier; and
(c) a respective bulkhead structure located adjacent said outer end of each end unit, said bulkhead structure including a longitudinally inwardly and downwardly sloping outer edge and said inter-car gap narrowing device being attached thereto by a triangular generally planar gusset oriented in a vertical, longitudinal plane and a pair of brackets.

32. A multi-unit railcar configured to carry removable intermodal cargo containers in respective upper and lower tiers thereupon, comprising:
(a) at least two car units, including a pair of oppositely oriented end units, each said end unit having a pair of opposite sides and an outer end;
(b) an inter-car gap narrowing device located adjacent said outer end of one of said end units, said inter-car gap narrowing device including a pair of rigid, generally planar vertical panels spaced laterally apart from each other, each being oriented generally parallel with said sides of said end unit, and each of said vertical panels extending upwardly adjacent said upper tier; and
(c) a generally planar, laterally-extending member disposed horizontally between said vertical panels.

33. A multi-unit railcar configured to carry removable intermodal cargo containers in respective upper and lower tiers thereupon, comprising:

(a) at least two car units, including a pair of oppositely oriented end units, each said end unit having a pair of opposite sides and an outer end; and (b) an inter-car gap narrowing device located adjacent said outer end of one of said end units, said inter-car gap narrowing device including a pair of rigid, generally planar vertical panels spaced laterally apart from each other, each being oriented generally parallel with said sides of said end unit, and each of said vertical panels extending upwardly adjacent said upper tier, each of said vertical panels being located laterally aligned with a respective one of said opposite sides of said end unit.

34. A railcar including structure defining respective upper and lower container positions for receiving generally rectangular intermodal cargo containers therein, said upper container position defining a container top position having a predetermined height and said railcar including a body having an outer end including bulkhead means for longitudinally and laterally restraining a cargo container in said upper container position, and including an inter-car gap narrowing device including a pair of parallel rigid, generally planar, vertical panels spaced laterally apart from one another and aligned laterally with the respective sides of said railcar, each of said vertical panels extending upward substantially to the height of a container top position of said upper container position.

35. The railcar of claim 34 wherein said railcar includes a coupler connected with said outer end and each of said vertical panels extends longitudinally away from a location adjacent said container position toward said coupler to a predetermined distance from the extremity of said coupler, said predetermined distance being established by the minimum clearance required to avoid interference with another car while said car negotiates a curve in a railway track.

36. The railcar of claim 34 including a top of said lower container position and a horizontal panel extending between said vertical panels at a predetermined height above the top of said lower container position.

37. The railcar of claim 34, including a top of said lower container position, and said inter-car gap narrowing device defining a loader clearance space at least 6 feet wide between said vertical panels at all heights above a predetermined height relative to the height of the top of said lower container position.

* * * * *

UNITED STATES PATENT AND TRADEMARK OFFICE
CERTIFICATE OF CORRECTION

PATENT NO.   : 4,756,256
DATED        : July 12, 1988
INVENTOR(S)  : Marvin G. Rains, et al.

It is certified that error appears in the above-identified patent and that said Letters Patent is hereby corrected as shown below:

Col. 7, line 3     Change "interunit" to --inter-unit--

Col. 7, line 19    Change "interunit" to --inter-unit--

Col. 15, line 42   After "apart" insert --from one another, each of said vertical panels extending upward--

Signed and Sealed this

Third Day of July, 1990

*Attest:*

HARRY F. MANBECK, JR.

*Attesting Officer*     *Commissioner of Patents and Trademarks*